United States Patent [19]
Bosanquet

[11] Patent Number: 5,427,140
[45] Date of Patent: Jun. 27, 1995

[54] VALVE ASSEMBLY

[76] Inventor: John Bosanquet, 142 Central Avenue, Oak Flats, New South Wales 2529, Australia

[21] Appl. No.: 112,623
[22] Filed: Aug. 26, 1993
[51] Int. Cl.[6] .................. F16K 37/00; F16K 51/00
[52] U.S. Cl. ...................... 137/554; 251/93; 251/285; 251/288; 116/202; 116/277
[58] Field of Search .......... 137/554, 551, 559; 251/92, 93, 285, 288; 116/202, 277, 307

[56] References Cited

U.S. PATENT DOCUMENTS

| | | | |
|---|---|---|---|
| 1,017,224 | 2/1912 | MacBeth | 116/277 |
| 1,408,611 | 3/1922 | Larner | 137/554 X |
| 1,820,772 | 8/1931 | Blake | 251/285 X |
| 3,361,148 | 1/1968 | Turek | 251/285 X |
| 3,537,473 | 11/1970 | DeZurik, Jr. | 251/288 X |
| 3,565,089 | 2/1971 | Thompson | 251/285 X |
| 3,712,587 | 1/1973 | Specht | 251/285 |
| 3,717,171 | 2/1973 | Fawkes | 137/554 X |
| 3,946,756 | 3/1976 | Specht | 251/285 X |
| 4,064,904 | 12/1977 | Tolnai | 251/288 X |
| 4,156,437 | 5/1979 | Chivens et al. | 137/554 |
| 4,299,251 | 11/1981 | Dugas | 137/554 X |
| 4,694,512 | 9/1987 | Knebel et al. | 4/192 |

FOREIGN PATENT DOCUMENTS

| | | |
|---|---|---|
| 4635185 | 5/1988 | Australia . |
| 6161386 | 11/1990 | Australia . |
| 2073888 | 2/1992 | Australia . |
| 3922089 | 10/1992 | Australia . |
| 2579714 | 10/1986 | France . |
| 2593260 | 7/1987 | France . |
| 2041167 | 9/1980 | United Kingdom . |
| 2087520 | 5/1982 | United Kingdom . |
| 89/09956 | 10/1989 | WIPO . |

Primary Examiner—John Rivell
Attorney, Agent, or Firm—Laff, Whitesel, Conte & Saret, Ltd.

[57] ABSTRACT

A valve assembly is disclosed which comprises a screw spindle threadingly mounted to a valve housing and having a tap handle secured to a first end and a valve disc located at a second end, and wherein rotation of the spindle causes the valve assembly to move between an open and a closed position. The valve assembly further incorporates an indicator arranged to indicate a predetermined degree of rotation of the spindle from the closed position.

14 Claims, 3 Drawing Sheets

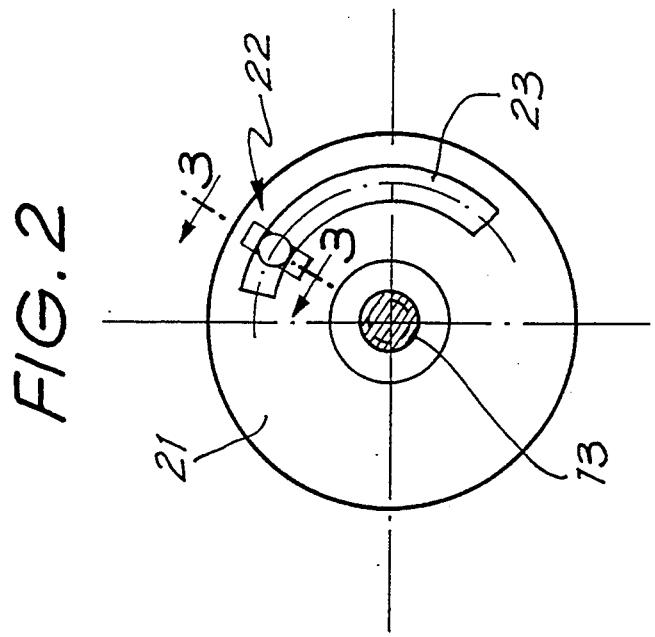
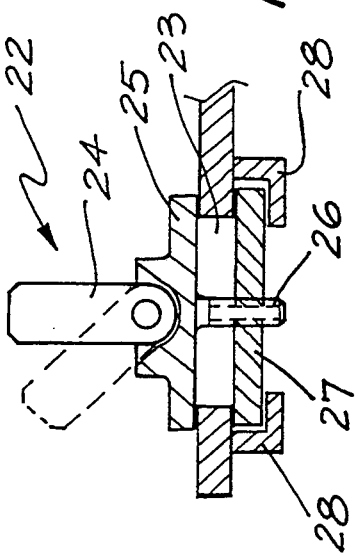
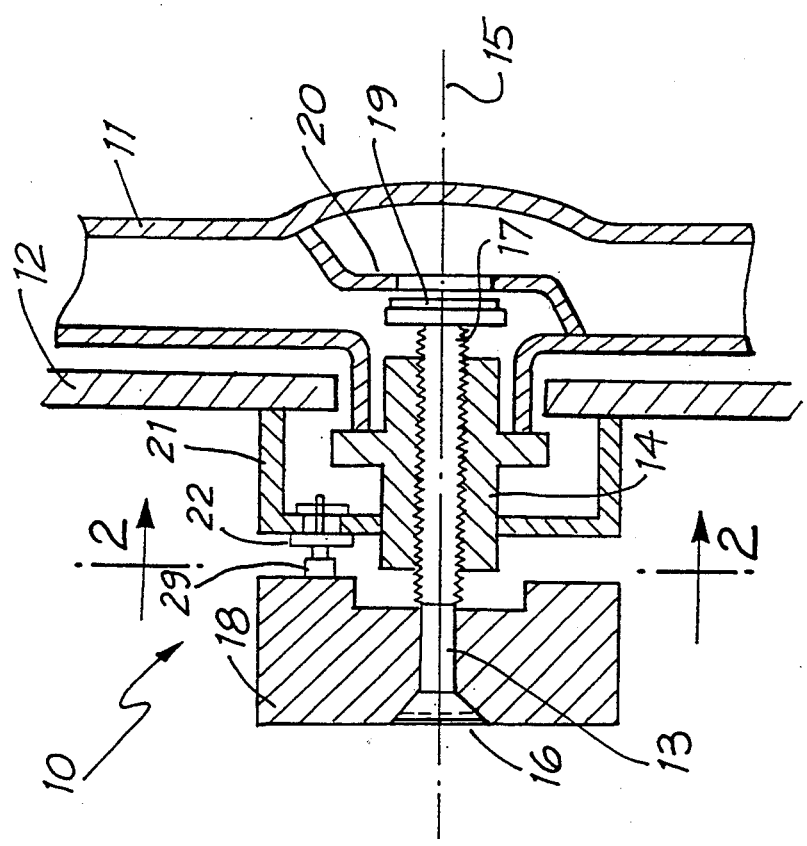

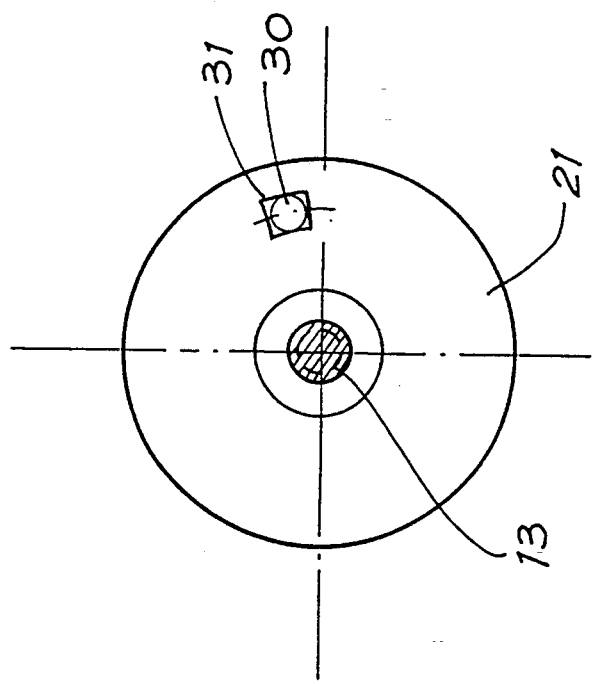
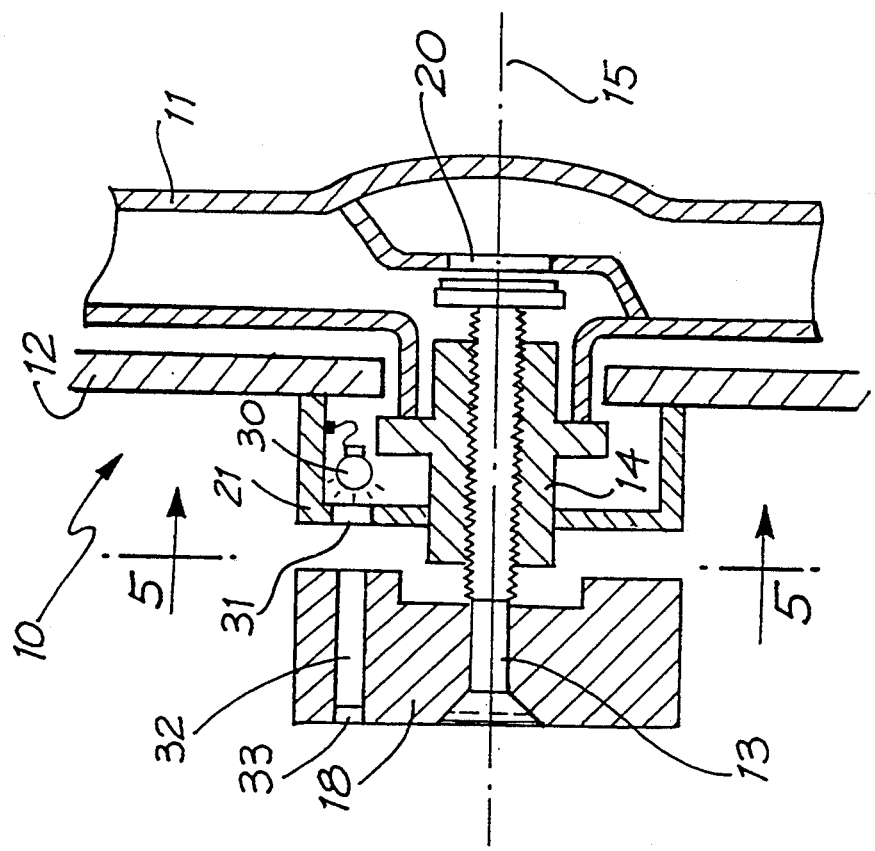

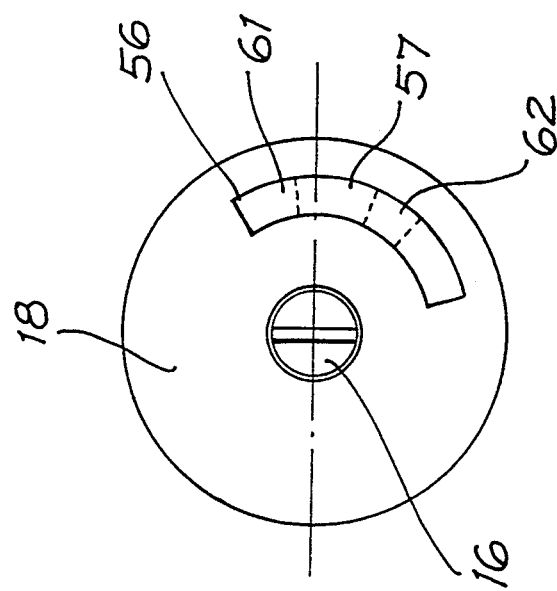
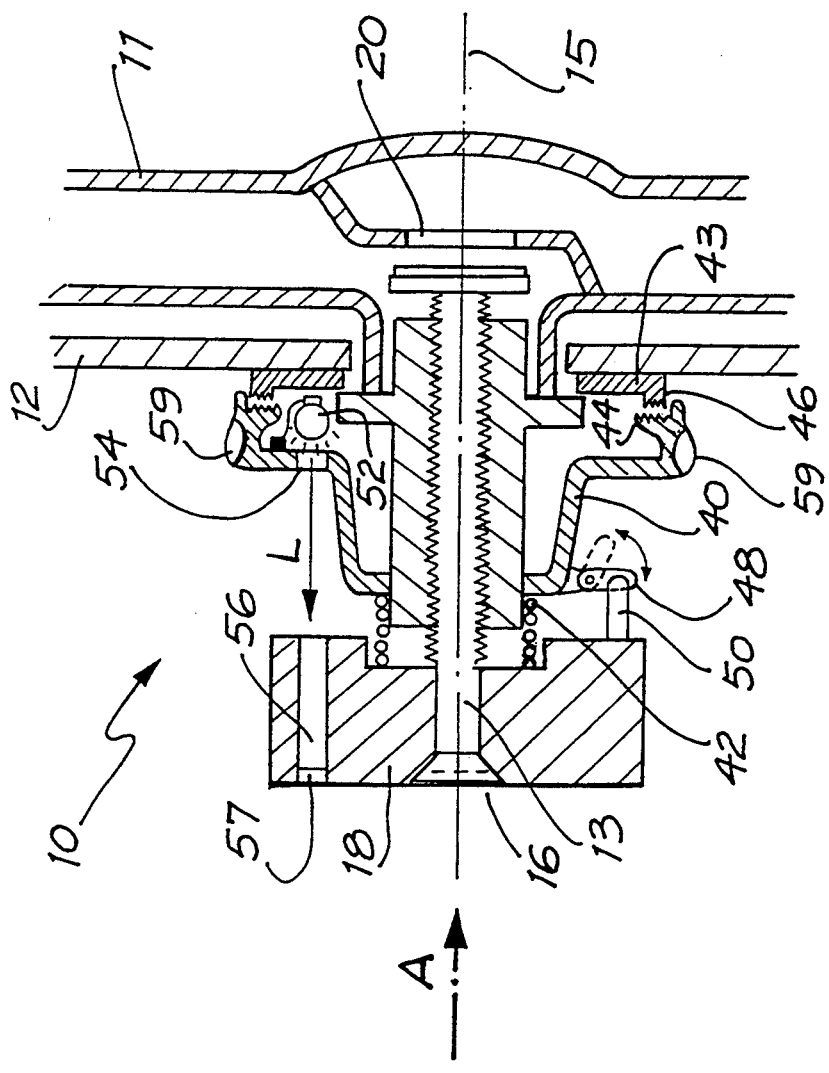

VALVE ASSEMBLY

The present invention relates to a valve assembly and has particular application for water taps and is herein described in this context. However, the valve assembly according to the present invention has broader application and may be used to regulate any fluid, either liquid or gas.

A common tap assembly incorporates separate hot and cold water taps arranged to regulate the flow through respective hot and cold water pipes. The pipes are joined downstream of the taps to exit through a single spout. This is the normal arrangement for a shower. A problem associated with this type of assembly is that it is difficult to quickly regulate the taps such that the water flows from the spout at an ideal temperature. Usually the hot and cold water taps are turned on, the temperature is checked and then the taps are adjusted until the preferred temperature is obtained. This process is time consuming and often tends to waste considerable amounts of water. Furthermore, for the elderly or for people with disabilities, this task can be quite difficult.

The aim of the present invention is to ameliorate this problem.

In a first aspect the present invention provides a valve assembly comprising a screw spindle having a central axis interconnecting first and second ends, the screw spindle being threadingly mounted to a valve body and being capable of rotation about said axis, a handle being secured to the first end of the spindle and a valve disc being located at the second end, the valve assembly being arranged such that rotation of the spindle about said axis causes the valve assembly to move from a closed to a fully open position, the valve assembly further comprising indicating means arranged to indicate a predetermined degree of rotation of the spindle from the closed position, the indicating means comprising a light source arranged to project a beam and a receiver, one of either the light source or the receiver being located and/or moveable in the handle and the other being positioned or positionable such that on rotation of the spindle, the receiver is caused to register with the beam to emit a signal wherein said signal indicates the predetermined degree of rotation of the spindle.

Preferably, the valve assembly further comprises a housing in which the light source is located and preferably the line of projection of the beam can be varied or the position of the receiver in the handle can be varied to vary the predetermined degree of rotation to be indicated by the indicating means.

In a preferred embodiment, the receiver comprises an aperture incorporating a transparent or translucent material, preferably a plastic, therein and is arranged such that as the beam crosses the receiver, the light beam passes through the aperture and illuminates the plastic material, and the illumination of the plastic material constitutes the signal.

Alternatively, the receiver may be located in an arcuate or circumferential slot through which the line of projection of the beam travels when the housing is rotated, whereby the receiver may extend along some or all of the arcuate or circumferential slot and whereby indicia within the receiver itself indicate the predetermined degree of rotation.

Preferably, the indicating means additionally comprises a stop, which is mounted to a housing surrounding the valve body, the stop being movable on the housing or the housing being movable along a line which maintains a constant radius of the stop from the axis of the spindle, and a lug extending from the handle and arranged to engage the stop on rotation of the spindle, wherein engagement of the stop and the lug indicates the predetermined degree of rotation of the spindle.

In one embodiment, the indicating means can comprise a stop slidably mounted in a slot located on a housing surrounding the valve body. The stop can slide in guide channels which are arcuate in shape and arranged to extend at a constant radius from the axis of the spindle. The indicating means then further incorporates a lug extending from the handle which is arranged to engage the stop on rotation of the spindle. In use the stop is positioned within the guide channels such that on rotation of the spindle from the closed position, engagement of the lug with the stop indicates the said predetermined degree of rotation of the spindle.

Preferably, the stop is releasably secured to the guide channels and preferably this is through a clamping action. In this way the stop can be moved to its correct position and clamped into place. This is beneficial as it prevents inadvertent movement of the stop in the guide channels.

Alternatively, when the housing is rotated about the axis of the spindle to change the position of the stop with respect to the handle, the stop is fixedly and pivotally mounted to the housing.

Preferably, the stop is able to pivot relative to the housing from an upright position wherein on rotation of the spindle the lug engages the stop, to an inclined position wherein the lug and the stop do not engage on rotation of the spindle. Therefore, once in the inclined position, the stop does not prevent rotation of the spindle from the closed position to the fully open position.

In a further aspect, the present invention relates to indicating means arranged to be used in the valve assemblies as described above.

Notwithstanding any other forms that may fall within its scope, a preferred form of the invention will now be described by way of example only with reference to the accompanying drawings in which:

FIG. 1 is a sectional view of a water tap incorporating a form of indicating means according to an embodiment of the present invention;

FIG. 2 is a sectional view along section line 2—2 in FIG. 1;

FIG. 3 is a sectional view along section line 3—3 in FIG. 2;

FIG. 4 is a sectional view of a water tap according to another embodiment of the present invention;

FIG. 5 is a sectional view along section line 5—5 in FIG. 4;

FIG. 6 is a sectional view of a water tap according to a further embodiment of the present invention; and FIG. 7 is a view of the water tap of FIG. 6 taken in the direction of arrow A.

It should be noted throughout the drawings that like reference numerals will be used for like parts.

As illustrated in FIGS. 1 to 3, a tap 10 is connected in series to a hot water pipe 11 and arranged to regulate the flow therethrough. The tap 10 forms part of a shower assembly (not shown) which comprises an identical tap to regulate the cold water pipe and the hot and cold water pipes are joined downstream of the respective taps such that the water flow exits through a shower rose. As the tap forms part of the shower assembly it is mounted to the bathroom wall 12.

The tap 10 comprises a screw spindle 13 threadingly mounted to a valve body 14, such that it is able to rotate around a central axis 15. The axis 15 of the spindle 13 interconnects a first end 16 and a second end 17. A tap handle 18 is mounted to the first end 16 and a valve disc 19 is located at the second end. The valve disc 19 is arranged to register with a valve seat 20 located in the pipe 11.

Rotation of the spindle causes movement of the spindle along the line of the cental axis 15. In this way, rotation of the spindle 13 causes the spindle to move from a closed position where the valve disc 19 registers with the valve seat 20, to a fully opened position wherein the valve disc is remote from the valve seat 20.

An outer housing 21 extends around the valve body 14 and is secured to the wall 12. Although in this embodiment, the housing is separate from the wall 12 in an alternative embodiment (not shown), the outer housing 21 is not required as the tap 10 is further recessed into the wall 12 such that the wall 12 abuts directly onto the valve body 14. In this way the wall 12 becomes the outer housing for the tap 10.

A stop 22 is located on the housing and is slidably mounted within a slot 23. The slot is arcuate in shape and arranged to extend at a constant radius from the axis 15 of the spindle 13.

The stop 22 comprises a projection 24 which is pivotally mounted to a base 25 which abuts the housing 21 at the periphery of the slot 23. The projection 24 is able to move from an upright position to an inclined position as shown in phantom in FIG. 3.

The base 25 incorporates a bolt 26 to which a flat nut 27 is connected. The flat nut which is rectangular in shape is arranged to extend across the width of the slot 23 and be retained within guide channels 28. With this arrangement rotation of the base 25 causes relative movement between the base plate 25 and the nut 27. This forms a clamping action which enables the stop 22 to be releasably clamped to the housing 21.

A lug 29 extends from the tap handle 18 and when the stop 22 is in the upright position, it is arranged to engage the stop on rotation of the handle and spindle.

A shower assembly incorporating two like taps 10 is arranged to operate as follows:

Initially, the taps 10 are in the fully closed position and the stop 22 on each tap 10 is in the inclined position. To operate the shower, the taps are turned on and the taps are adjusted until the water flows from the shower rose at an ideal temperature. The stops 22 from each of the taps are then moved in the arcuate slots until they are located adjacent to the lug 29. Each stop 22 is moved to the upright position and is arranged to abut the lugs to prevent further rotation of the handle, and as such the spindle, to the fully open position. The stops are then clamped into this position by rotation of the base 25 relative to the flat nut 28.

The stops have now been correctly located and after use of the shower, the taps are turned off in the normal manner. However when the shower is to be used again, rather than needing to check the water temperature and adjust the taps, with the provision of the stops 22 being correctly located, all that is necessary is that the taps are turned from the closed position until the lug 29 engages the stop 22 as this position indicates the degree of rotation of the spindle which is necessary to produce the ideal water temperature. Therefore the time required to set the shower is reduced, in addition a minimum amount of water is wasted. Furthermore, if for any reason it is necessary to alter the temperature by opening the valves further, all that is required is that the stops are moved to their inclined position wherein they do not inhibit rotation of the spindle to the fully open position.

Referring to FIGS. 4 and 5, rather than use a stop 22, a light source 30 is provided within the housing 21 and is arranged to project a light beam through an aperture 31 in the direction of the handle 18. The handle incorporates an aperture 32 which is arranged to register with the light beam at a particular point on the rotation of the spindle. A plastic material 33 is located within the aperture and is arranged to illuminate once the light beam passes through the aperture. This illumination gives a signal that the light beam has registered with the aperture.

Thus, the spindle is rotated to its predetermined position. The light source is then moved, for example, by rotating the housing about central axis 15, until the light's beam aligns with and projects into aperture 32, illuminating the plastic material 33. This housing position can be fixed so as to allow the relocation of the spindle at this position at some future point in time, thus, with this arrangement, the light beam and aperture can be used to indicate when the spindle has moved through a predetermined degree of rotation from the closed position.

A further alternative (not shown) also uses a light source. However instead of a small aperture located within the handle, an arcuate slot is located within the handle and arranged to extend at a constant radius from the axis of the spindle.

An indicator is slidably mounted within the slot and in this arrangement the beam from the light source 31 is arranged to project into the arcuate slot and, as the handle rotates the beam will cross the path of the indicator located within the slot. As this indicator can move within the slot the exact point at which the light beam registers with the indicator can be varied. The registering of the light beam with the indicator can be used to indicate a predetermined degree of rotation of the spindle from the closed position. Furthermore this degree of rotation can be varied by sliding of the indicator within the arcuate slot.

The indicator can slide in guide channels which are arcuate in shape and which are arranged to extend at a constant radius from the axis of the screw spindle. The indicator can be made releasably secured to the guide channels through a clamping action.

Referring to FIGS. 6 and 7, alternative embodiments for both the stop 22 and light source 30 are shown. In the embodiment shown in FIG. 6, the alternative stop and light source are shown together on the tap assembly, however, it would be most usual that a light source would be used separately on a tap assembly from the stop. Thus for reasons of brevity the stop and light source have been shown and described together on the same assembly.

Referring specifically to FIG. 6, the tap includes a bell shaped outer housing 40 which is spring biased towards the wall 12 by a spring 42. The base of the housing engages with and is held by the spring against a circular mounting plate 43 which is mounted to the wall 12 and extends around the valve body and protruding pipe assembly.

At the inner periphery of the housing base, a plurality of housing teeth 44 are formed, and these engage with a corresponding plurality of mounting plate teeth 46 extending around the outer perimeter of the mounting plate. The engagement between teeth 44 and 46 is such that the housing is prevented from rotating about axis 15.

A stop 48 is pivotally mounted to the outer housing 40 and may be pivoted downwardly to the position indicated by the phantom outline in FIG. 6. When outer housing 40 is rotated about the axis 15 (as explained below), and when the stop is vertically aligned as shown in bold in FIG. 6, the stop will eventually engage a lug 50 projecting from the tap handle 18. If such engagement is not required, then the stop is simply pivoted to the position as shown in phantom outline.

Mounted within the housing is a light source 52 which is adapted to emit light through a transparent window 54, typically a transparent plastic or glass square or circular window. The light travels through the window in the direction of arrow L and may pass into an arcuate slot 56 extending through the handle 18, depending on the relative orientation of the handle with respect to the outer housing. At the outside face (i.e. that face which would confront a user of the tap) an arcuate window 57 is arranged, the details of which are explained below.

The housing 40 is provided with a plurality (e.g. a pair) of finger gripping recesses 59. A user may rotate the housing about axis 15 by firstly gripping the finger recesses 59 and then sliding the housing away from the wall 12 (i.e. in a direction parallel to arrow L) so that the spring 42 is compressed against the tap handle 18. Thus, housing teeth 44 are disengaged from the mounting plate teeth 46 and the housing is thereby free to rotate in either clockwise or anti-clockwise directions about the axis 15. After rotation of the housing 40 to a desired position, the housing is released and spring 42 then displaces the housing back towards the wall 12 (i.e. in a direction parallel to arrow A) so that once again housing teeth 44 engage the mounting plate teeth 46. The housing is once again now prevented from rotation.

When rotating the housing in either clockwise or anti-clockwise directions, the relative position of the light source 52 and stop 48 are changed with respect to handle 18. Thus, in an analogous manner to the embodiments described above, the light source and/or the lug can be used to provide a predetermined indication of position to which the tap handle may be rotated (i.e. for a desired water flow and temperature).

Referring to FIG. 7, the tap handle 18 may be provided with an arcuate slot 56 (instead of the aperture 32). Arcuate window 57 may comprise a number of different window indicia regions (e.g. different coloured panels 61 and 62). Thus, for a given rotational position of the light source, the tap handle may be rotated so that one of the indicia aligns with the light beam L travelling through arcuate slot 56 to provide the user with a preferred indication of location.

The indicia can be for example different coloured light panels, markings or gradations, etc. The indicia may be used to provide the user with a preferred indication of flow rate and/or temperature, etc.

In use, initially the tap 10 is in the fully closed position and, when present, the stop 48 is moved to the position shown in phantom in FIG. 6. The tap is turned on and adjusted until the water flow and temperature is ideal.

When the stop forms the means of indication, the stop is pivoted to be vertical and the housing 40 is then turned (typically in an opposite direction to the tap opening direction) until the stop 48 engages lug 50. This position of rotation of the housing then provides the ideal location of the tap valve for future use by the user.

When the light source is the means of indication, the housing is rotated until the light source illuminates a given indicia in the arcuate window 57. The user chooses a suitable indicia and thus the tap can be repositioned at this location in future use.

The advantage of the arcuate window is that for a given rotational position of the housing, small rotational movements of the tap handle 18 will illuminate different indicia 61, 62, for example. Thus for different users, there may be no need to change the rotational position of the housing 40. Rather, a user may simply have one indicia as their means of indication and another user may have a different indicia as their means of indication. In this regard, the arcuate slot may in fact extend completely around the handle 18 to be a circumferential slot, with the outer portion of the handle being connected to the inner portion of the handle adjacent the spindle 13 by appropriate means, e.g. webbing, etc. A whole series of indicia could then be positioned around the circumference of the slot and this may be advantageous where there are many users of the one tap system.

Whilst the invention has been described with reference to a number of preferred embodiments, it should be appreciated that the invention can be embodied in many other forms.

The claims defining the invention are as follows:

1. A valve assembly comprising a screw spindle having a central axis interconnecting first and second ends, the screw spindle being threadingly mounted to a valve body and being capable of rotation about said axis, a handle being secured to the first end of the spindle and a valve disc being located at the second end, the valve assembly being arranged such that rotation of the spindle about said axis causes the valve assembly to move from a closed to a fully open position, the valve assembly further comprising indicating means arranged to indicate a predetermined degree of rotation of the spindle from the closed position, the indicating means comprising a light source arranged to project a beam and a receiver, one of either the light source or the receiver being located and/or moveable in the handle and the other being positioned or positionable such that on rotation of the spindle, the receiver is caused to register with the beam to emit a signal wherein said signal indicates the predetermined degree of rotation of the spindle.

2. A valve assembly as claimed in claim 1, further comprising a housing wherein the light source is located in the housing and the receiver is located in the handle and wherein the signal emitted by registering of the beam and the receiver consists of illumination of the receiver.

3. A valve assembly as claimed in claim 1 or claim 2, wherein the line of projection of the beam is varied to vary the predetermined degree of rotation indicated by the indicating means.

4. A valve assembly as claimed in claim 3, wherein when the light source is located in the housing and the receiver is located in the handle, rotation of the housing about the central axis causes the line of projection of the beam to be varied.

5. A valve assembly as claimed in claim 1 wherein when the receiver is located in the handle, the position of the receiver in the handle can be varied to vary the predetermined degree of rotation indicated by the indication means.

6. A valve assembly as claimed in claim 5, wherein the receiver is slidably mounted in a slot located in the handle, the receiver sliding in guide channels which are arcuate in shape and arranged to extend at a constant radius from the central axis.

7. A valve assembly as claimed in claim 1 wherein the receiver is formed from a transparent or translucent material.

8. A valve assembly as claimed in claim 1 wherein the indicating means additionally comprises a stop which is mounted to a housing surrounding the valve body, the stop being movable on the housing or the housing being movable along a line which maintains a constant radius of the stop from the axis of the spindle, and a lug extending from the handle and arranged to engage the stop on rotation of the spindle, wherein engagement of the stop of the lug indicates the predetermined degree of rotation of the spindle.

9. A valve assembly as claimed in claim 8, wherein the stop is slidably mounted in a slot located on the housing surrounding the valve body.

10. A valve assembly as claimed in claim 9, wherein the stop slides in arcuately shaped guide channels which are arranged in the housing to extend at a constant radius from the axis of the spindle.

11. A valve assembly as claimed in claim 10, wherein in use, the stop is positioned within the guide channels such that on rotation of the spindle from the closed position, engagement of the lug with the stop indicates the said predetermined degree of rotation of the spindle.

12. A valve assembly as claimed in claim 9 or claim 12, wherein the stop is releasably secured to the guide channels via clamping means.

13. A valve assembly as claimed in claim 8 wherein the stop is fixedly mounted to the housing for the case when the housing is moveable along said line which maintains said constant radius of the stop from the axis of the spindle, thus enabling the position of the stop with respect to the handle to be changed.

14. A valve assembly as claimed in claim 8 or claim 13, wherein the stop is pivotally mounted to be capable of pivoting relative to the housing between an upright position, wherein on rotation of the spindle the lug engages the stop and an inclined position, wherein the lug and spindle do not engage on rotation of the spindle.

* * * * *